Aug. 11, 1936.  McKINLEY PALMER  2,050,729
AUTOMATIC CLUTCH CONTROL
Filed May 12, 1934   2 Sheets-Sheet 1
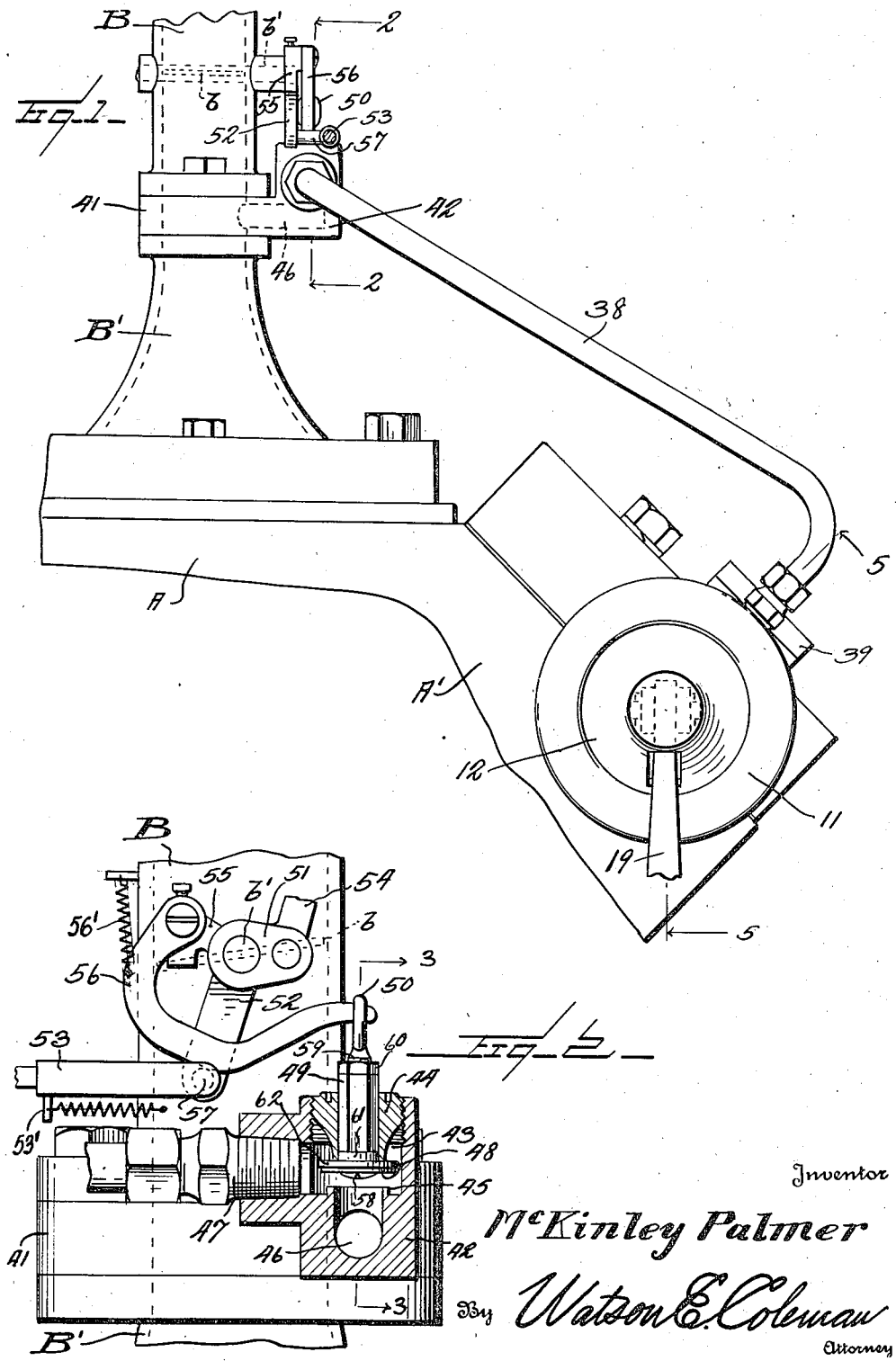
Inventor
McKinley Palmer
By Watson E. Coleman
Attorney

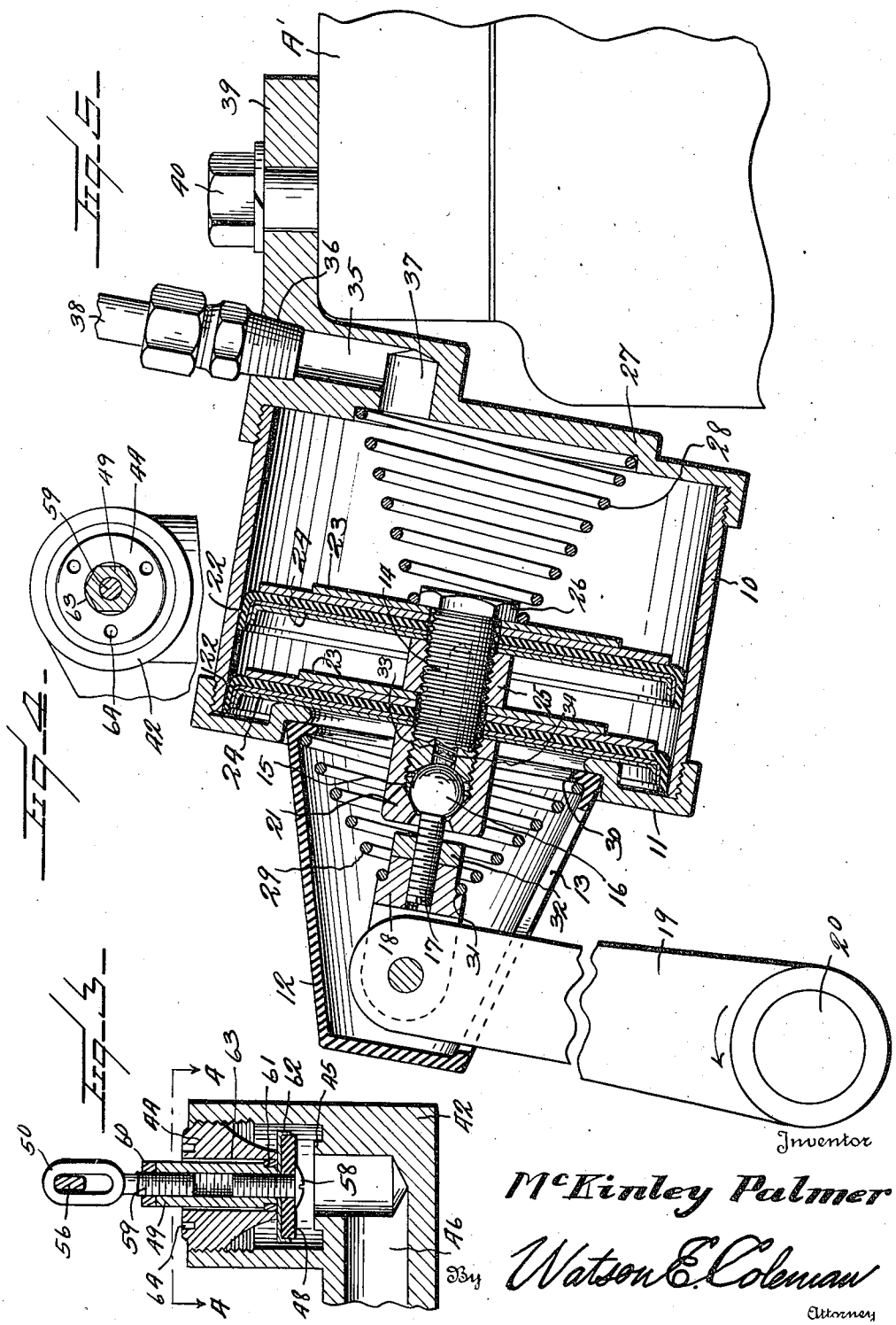

Patented Aug. 11, 1936

2,050,729

UNITED STATES PATENT OFFICE 2,050,729

AUTOMATIC CLUTCH CONTROL

McKinley Palmer, Beverly Hills, Calif.

Application May 12, 1934, Serial No. 725,403

6 Claims. (Cl. 192—.01)

This invention relates to automatically controlled clutches of motor cars, boats, airplanes and other clutch mechanism of that type in which upon a relase of pressure on the accelerator pedal, the clutch of the vehicle will be automatically thrown out and upon a reapplication of the accelerator pedal, the clutch will be automatically thrown into engagement to connect the motor with the driving shaft of the vehicle.

One object of my invention is to provide a mechanism of this character which is particularly simple, may be easily and quickly applied to a car at relatively small expense, which eliminates the clutch pedal entirely, which elimiates the necessity of any dash controls and which permits the motor to be used as a compression brake on downward grades and permits the car to be readily started from a standstill on an up-grade without stalling the motor.

Generally speaking the invention comprises a cylinder, a piston therein operatively connected to the clutch lever, and a valve associated with the intake of the engine and operatively connected to the throttle valve, this valve, when the throttle is shifted to a closed position, opening to establish communication between the interior of the cylinder behind the piston and the intake of the engine manifold so that the suction thus created by the engine will withdraw air from behind the piston and cause the piston to shift to a position to positively disengage the clutch, the mechanism being such that when the accelerator is depressed and the throttle opened, the clutch springs will shift the piston in the opposite direction and throw in the clutch.

My invention is illustrated in the accompanying drawings, wherein:—

Figure 1 is a fragmentary end elevation of an engine block with my invention applied thereto;

Figure 2 is a section on the line 2—2 of Figure 1;

Figure 3 is a section on the line 3—3 of Figure 2;

Figure 4 is a section on the line 4—4 of Figure 3;

Figure 5 is a section on the line 5—5 of Figure 1;

Referring to these drawings, and particularly to Figure 5, A designated an engine block and A' one of the cylinders thereof. Mounted upon the engine block, as will be explained, is a cylinder 10 closed at one end by a screw-threaded annular head 11. The opening of this head is covered in turn by a frusto-conical cap 12 which is preferably made of rubber or like material and simply acts as a protection to the mechanism disposed within the cap. This cap has a side opening 13.

Disposed within the cylinder 10 is a plunger or piston rod section 14 formed at its outer end with a ball receiving recess 15 to receive the ball 16 which is mounted upon the end of a screw-threaded connecting rod section 17.

Engaging the screw-threads of the section 17 is a tubular section 18 in turn pivotally connected to the arm 19 mounted on the clutch lever operating rock shaft 20, the clutch not being shown. When the arm 19 is moved in the direction of the arrow in Figure 5, the clutch is thrown into engagement and when the arm is moved in the reverse direction, the clutch is disengaged.

The ball 16 is held to its seat 15 by means of a screw-threaded sleeve 21 flanged to engage around the ball. There is thus provided a ball and socket joint between the sections 14 and 17.

The inner end of the piston rod section 14 carries upon it the leather cap 22, the inner face of which is supported by a rigid disk or a plurality of these disks designated 23, the opposite face of the cup leather being supported by the cup-shaped elements 24. Disposed around the rod section 14 is a sleeve 25 which bears at one end against the supports 24 and clamps the piston formed of the parts 22, 23, and 24 against the head or nut 26 forming the end of the section 14. Clamped between the sleeve 25 and the sleeve 21 is a second piston constructed in the same manner as the first-named piston, that is, having the cup leather 22, the disk or disks 23 and the cup-shaped supports 24. The sleeves 21 and 25 and the head or nut 26 thus provide means for clamping these pistons securely in place while by unscrewing the sleeve 21 from the rod 14, the pistons may be readily taken off and replaced or repaired. The marginal edges of the cup leathers or equivalent elements 22, of course, bear against the walls of the piston.

The inner end of the cylinder 10 is closed by a screw-threaded head 27. Bearing against one face of this head is a coiled compression spring 28 preferably conical in form, the other end of the compression spring bearing against the adjacent piston and surrounding the head 26.

Surrounding the sleeve 21 is a second compression spring 29 which is preferably conical bearing at one end against a seat or flange 30 formed on the cap or housing 12 and at its other end bearing against a seat 31 formed on the member 18. Thus this spring acts to hold the cap 12 in place and at the same time urges the piston outward, as does the spring 28. A binding nut 32 engages the section 17 and bears against the section 18, thus permitting the section 17 to be adjusted. The section 14 is preferably formed with an interior chamber 33 adapted to hold lubricant and in this chamber is disposed a wick of fibrous material 34 which is urged against the ball 16 by a coiled spring surrounding the wicking.

Preferably cast in the head 27 is a duct 35 screw-threaded at its outer end as at 36, this duct at its inner end communicating through a port 37 with the interior of the cylinder 10 behind the piston. This duct 35 is connected by tubing or piping 38 to the intake of the carburetor B inward of the throttle valve b thereof as shown in Figure 1. The head 27 as shown in Figure 5 is preferably provided with a laterally projecting flange 39 held to the head of the cylinder A by means of the nut 40 or equivalent means.

As illustrated, the carburetor connection and intake B carries within it the throttle valve b. Between the section B and B' of the manifold, there is provided an annular section 41 having a laterally disposed valve body 42 whose interior construction is shown in Figure 2. This valve body is formed to provide a chamber 43 closed by an annular plug 44. The lower end of the chamber is formed with an upwardly extending valve seat 45 and below this valve seat with a duct 46 leading, as shown in Figure 1, into the interior of the section 41 and thus into the interior of the intake manifold. The pipe 38 has at its end a screw-threaded nipple 47 which opens into the interior of the chamber 43.

Coacting with the valve seat 45 is a valve 48 carried on the lower end of the valve stem 49 which extends up through the plug 44 and has sliding engagement in this plug. The upper end of this valve stem is formed with an eye 50. The shaft b' of the throttle valve b extends out through suitable bearings in the side of the tube or casing B and carries upon it the arm 51. This shaft b' also carries upon it the operating arm 52 connected by the link 53 to an accelerator pedal (not shown). This arm 51 is also connected by suitable means 54 to the usual hand operated controlling means for the throttle valve.

Mounted upon a bracket 55 is an angular lever 56 which extends downward and laterally beneath the arm 51 and beside the arm 52 and has its extremity extending into the eye 50. The link 53 and lever 56 may be provided with return springs 53' and 56' respectively. The depressed central portion of this lever 56 bears upon the pivot pin 57 which connects the arm 52 to the link or rod 53. When the accelerator pedal is depressed to increase the amount of gas fed to the engine, the pin 57 swings to the left in Figure 2, allows the lever 56 to fall, thus allowing the valve 48 to seat against the seat 45, thus cutting off communication between the intake of the engine and the cylinder 10. When the foot is taken off the accelerator pedal, however, the link 53 will move to the right in Figure 2, raising the lever 56 and raising the valve 48 from its seat, again connecting the interior of the intake manifold B below the throttle valve with the interior of the cylinder 10, thus causing a partial vacuum to be created in the inner end of the cylinder 10, drawing the pistons toward the right in Figure 5 and automatically disengaging the clutch.

As will be seen from Figure 3, the valve stem 49 is in the form of an interiorly screw-threaded sleeve. The valve 48 is held in place against the end of this stem or sleeve by means of the screw 58. The eye 50 is carried by a screw-threaded shank 59 which screws into the sleeve 49 and is held in adjusted position by means of the nut 60. Thus the effective length of the valve stem may be adjusted and the valve may be readily replaced or renewed. A ferrule 61 is disposed around the valve stem at its junction with the valve and bears against the metal disk 62 which forms a support for the valve 48, this valve being of rubber or like material.

For the purpose of allowing air to enter the interior of the cylinder 10 behind the pistons when the pistons are forced to the left in Figure 5 by the usual clutch springs, I form the sleeve of valve stem 49 hexagonal as shown in Figure 4, the ferrule 61 being cylindrical. The ferrule 61 fits snugly within the bore of the plug 44 when the valve is raised as shown in Figure 3, but when the valve is lowered against the seat 45, a plurality of ducts 63 are formed, as shown in Figure 4 between the wall of the bore in plug 44 and the sleeve 49 which permits the outside air to enter into the chamber 43 and to pass through the pipe 38 back into the rear end of the cylinder 10, thus breaking any partial vacuum in this cylinder and permitting the springs 28 and 29 to force the pistons to the left in Figure 5. Of course, the plug 44 is provided with the usual spanner sockets 64 so that a wrench may be applied to screw the plug in or unscrew it.

The rubber boot or housing 12 serves to protect the cylinder from the entrance of dirt, grease, dust, etc., the slot 13 allowing movement of the clutch arm 19 and permitting the inlet of air. It is to be noted that when the valve is in the position shown in Figure 3, that is, open, the collar or ferrule 61 fits snugly within the plug 44, thus preventing the passage of air between the hexagonal sleeve 49 and the bore of the plug 44. When the valve 48 is closed against its seat 45, however, then the air ducts 63 are provided for the purpose stated.

The assembly and relative adjustment of the parts of the valve and its casing is such that when the accelerator pedal is in its undepressed position, the valve 48 is at its upward limit of motion as shown in Figure 3, that is, the valve is off the seat and communication is secured between the manifold B' and the pipe 38 and the interior of the cylinder 10 rearward of the piston. In this position, the suction of the intake manifold operates through the valve chamber 43 to draw the piston in cylinder 10 toward the head 27 and swing the clutch arm 19 toward the right in Figure 4, thus maintaining the clutch in the forward or "out" position.

When the accelerator is depressed by the operator of the car, the throttle arm on the carbureter B moves back, that is, toward the left in Figure 2 and allows the lever 56 to lower and with it the valve stem 49 and the valve 48 lower, the valve seating against the seat 45. In this position, the passage from the intake manifold through the valve chamber 43 through tube 38 to the cylinder 10 is closed, the air ducts 63 are open and the clutch springs force the piston back with its attached clutch arm to an engaged or "in" position. The lowering of the valve stem 49 opens a duct to the outside air so as to permit the pistons to move under the actions of springs. In this position, as above stated, suction is cut off and the clutch moves to its "in" position. When the valve 48 is down on its seat, the clutch is engaged with the motor, thus starting the motor in case it stalls while the car is in motion. In other words when the car is moving should the engine stall it is necessary merely to step on the throttle thus causing the clutch to operate whereby the engine will be turned over due to inertia of the moving car and thus the engine will be started. Cars with other devices must have automatic starters. When the valve is open three-thirty-seconds of an inch, air is allowed to flow to the full capacity of the three-eighths copper tubing 36, the valve being opened when the throttle is completely closed. This enables the operator to bring his car to a very slow speed, using low compression. The car can then, if it is standing on level ground, be moved either forward or reversely without changing the speed of the motor or vice versa, the motor can be speeded up to see whether it is missing or not without moving the car. This is due to the fact that there is a slight interval when the throttle is first depressed before the vacuum causes the clutch to be engaged and during this interval by quickly pressing down on the throttle the engine can be accelerated and then allowed to die down again before the vacuum device functions. The second operation can be performed by giving the motor the gas quickly and to move the car without changing the motor, you slowly open the throttle. If you are going down hill, put your car in the required gear to make it travel at the rate of speed at which you wish to go. Leaving your foot off the accelerator entirely will enable you to free wheel, in any gear, until such time as you wish to slow up. Then open the throttle just a little bit. It does not necessitate changing the speed of the motor to use it as a compression brake.

Shifting of gears is very easy because all the operator has to do is to take the foot off the throttle which immediately releases the clutch. The driver can also operate the car in reverse the same as it can be in forward. The clutching mechanism which I have devised is an automatic clutching mechanism and no clutch pedal is used whatsoever.

It will be seen that with this clutching mechanism, the engine idles freely and perfectly, the clutch being held in its "out" position automatically so long as the accelerator is not depressed. Slight depression of the accelerator pedal allows the clutch to engage and enables the car to be operated on compression using the engine compression for braking effect. With car in motion, moving the foot from the accelerator entirely throws out clutch and the car coasts freely. The clutch pedal is entirely done away with, shifting of gears is more readily and quietly secured at all speeds and particularly gears are more readily shifted on hills because the foot need only be lifted from the accelerator to throw out the clutch. With my invention it is not necessary to use the clutch as frequently as with the old type of devices and this lessened use reduces the wear on the throwout bearings of the car.

While I have illustrated certain details of construction and arrangements of parts, I do not wish to be limited thereto as obviously many changes might be made therein without departing from the spirit of the invention except as defined in the appended claims.

It is to be understood, of course, that the usual springs connected to the clutch lever for the purpose of throwing out the clutch will act to return the pistons in cylinder 10 toward the position shown in Figure 4. The springs 28 and 29 will urge the pistons toward the left in Figure 4 but the springs are mainly used for the purpose of holding the piston in line, retaining the boot 12 in place and retaining the piston in normal position, freeing the throw-out bearing of the car of any undue strain.

While I have described my automatic clutch control mechanism as being applied to a motor car, it is to be understood that it is equally applicable to any mechanism having a motor, a clutch, and a throttle valve and is applicable to boats, airplanes, and other like mechanisms and I, therefore, do not wish to be limited to the use of this device with a motor car specifically and by the term "automotive apparatus" as used in the claims, I include all types of automotive mechanism having a clutch and a throttle valve with manually controlled means for operating the throttle valve.

I claim:—

1. The combination with an internal combustion engine having an intake manifold provided with a throttle valve and a clutch operating arm, of a cylinder, a pair of spaced pistons therein, a screw-threaded rod section extending through the two pistons and having a ball receiving recess at its outer end, a sleeve surrounding said rod and disposed between the pistons, a second sleeve having screw-threaded engagement with the rod and having a central flared opening at its outer end, a connecting rod section pivotally connected to the clutch operating arm and having a central screw-threaded opening, and a ball adapted to be disposed against the recess in the first named rod section and having a screw-threaded shank extending through the aperture in the second named sleeve and engaging in the threaded opening of the last named section whereby a flexible and adjustable connection may be secured between the piston rod and the clutch operating arm.

2. For use in a clutch disengaging mechanism of the vacuum cylinder operated type, and which includes a valved connection between the intake manifold and the vacuum cylinder, said connection including a valve chamber having at one end a valve seat, a plug closing the other end of the valve chamber and having a central passage, a tubular, interiorly, screw-threaded valve stem operating through said passage, the lower end of the valve stem carrying a ferrule adapted to fit said passage when the valve stem is raised, a valve on the lower end of the stem coacting with said seat, a screw extending through the valve and into the valve stem and a second screw adjustably engaging the threads at the outer end of the stem and having an eye whereby the effective length of the valve stem may be increased or decreased, the stem above the ferrule being formed to provide an air inlet duct acting when the valve is lowered to permit air to enter the chamber.

3. For use in a clutch disengaging mechanism of the vacuum cylinder operated type, and which includes a valved connection between the intake manifold and the vacuum cylinder, said connection including a valve chamber having at one end a valve seat, a plug closing the other end of the valve chamber and having a central passage, a tubular, interiorly screw-threaded valve stem operating through said passage, the lower end of the valve stem carrying a ferrule adapted to fit said passage when the valve stem is raised, a valve on the lower end of the stem coacting with said seat, a screw extending through the valve and into the valve stem, a second screw adjustably engaging the threads at the outer end of the stem and having an eye whereby the effective length of the valve stem may be increased or decreased, the stem above the ferrule being formed to provide an air inlet duct acting, when the valve is lowered, to permit air to enter the chamber, and operating means for said valve including a lever extending into said eye.

4. In a vacuum power actuator for automotive vehicles provided with an internal combustion engine having a throttle controlled suction passage, a cylinder, a conduit communicating at one end with the interior of said cylinder, a valve device, said device including a body having a chamber therein, said body having a threaded aperture therein opening into said chamber and having a second aperture opening into said chamber coaxial with said threaded aperture, said body having a seat portion surrounding said second aperture at the chamber end thereof, said body having a passageway therein adapted to communicate with the engine suction passage, said body having a third aperture therein opening into said chamber, said conduit communicating with said third aperture, a plug member positioned in said threaded aperture, said plug member including an inwardly extending reduced portion, said plug member having an aperture therethrough, a valve, said valve including a head portion and a shank portion, said shank being polygonally shaped in cross-section, said valve head being positioned in said chamber and said shank being positioned in said nut aperture, said shank having a threaded aperture therein and a stem member threaded into said shank aperture, said stem having an aperture therein adapted to receive an operating arm.

5. In a vacuum power actuator for automotive vehicles provided with an internal combustion engine having a throttle controlled suction passage, a cylinder, a conduit communicating at one end with the interior of said cylinder, a valve device, said device including a body portion having a chamber therein, said body having an aperture therein opening into said chamber, said body including a seat portion surrounding said aperture at said chamber end, said body having a passageway therein adapted to be placed in communication with an engine suction passage, said body having a threaded aperture therein opening into said chamber and coaxial with said first aperture, said body having a third aperture therein opening into said chamber, said conduit communicating with said third aperture, a nut member in said threaded aperture, said nut member having an aperture opening into said recess, a valve, said valve including a head portion and a shank portion, said valve head being positioned in said chamber and said shank being positioned in said nut aperture, said shank being of less cross sectional area than said nut aperture, said valve head including a seat portion and the inner end of said nut including a coacting seat portion, said shank having a threaded aperture therein and a stem threaded into said shank aperture, said stem having an aperture therein adapted to receive an operating arm.

6. For use in a clutch disengaging mechanism of an internal combustion engine having an intake manifold provided with a throttle valve and a clutch operating arm, a cylinder, a piston therein, a connecting member between said piston and the clutch operating arm, said connecting member being adjustable, a spring disposed within said cylinder and engaging one end of the cylinder and the piston to urge the piston in the direction which causes the clutch operating arm to engage the clutch and a second spring bearing at one end against the connecting member and at the other end reacing against the cylinder to urge the arm in the same direction.

McKINLEY PALMER.